(12) United States Patent
Carnevali

(10) Patent No.: US 7,025,315 B2
(45) Date of Patent: Apr. 11, 2006

(54) GEODESIC MOUNTING APPARATUS

(76) Inventor: Jeffrey D. Carnevali, 3262-36 Avenue S.W., Seattle, WA (US) 98126

(\*) Notice: Subject to any disclaimer, the term of this patent is extended or adjusted under 35 U.S.C. 154(b) by 0 days.

(21) Appl. No.: 10/338,258

(22) Filed: Jan. 8, 2003

(65) Prior Publication Data
US 2003/0098401 A1 May 29, 2003

Related U.S. Application Data

(63) Continuation of application No. 09/855,171, filed on May 14, 2001, now Pat. No. 6,581,892.

(51) Int. Cl.
*F16M 11/14* (2006.01)
(52) U.S. Cl. .............. 248/276.1; 248/181.1; 248/288.51; 403/56; 403/90; 403/143
(58) Field of Classification Search .......... 248/181.1, 248/181.2, 276.1, 288.11, 288.31, 288.51, 248/481, 482, 483; 403/90, 114, 115, 122, 403/124, 125, 126, 141, 142, 143, 56; 84/421
See application file for complete search history.

(56) References Cited

U.S. PATENT DOCUMENTS

| | | | |
|---|---|---|---|
| 596,729 A | 1/1898 | White | 403/56 |
| 855,149 A | 5/1907 | Vaughn et al. | 248/181.1 |
| 1,280,013 A | 9/1918 | Goddard | 248/288.5 |
| 1,359,645 A | 11/1920 | Zink | 248/481 |
| 1,455,441 A | 5/1923 | Hodney | 403/56 |
| 1,934,223 A | 11/1933 | Booth | 248/482 |
| 2,121,317 A | 1/1938 | Cohen | 248/288.5 |
| 2,114,767 A | 4/1938 | Hodney et al. | 248/481 |
| 2,560,556 A | 7/1951 | Creedon | 248/216 |
| 2,650,788 A | 9/1953 | Hulstein | 248/181 |
| 2,710,609 A | 6/1955 | Giller | 403/141 |
| 3,096,061 A | 7/1963 | Bertell | 248/283 |
| 3,843,272 A | 10/1974 | Jorn | 403/132 |
| 4,066,231 A | 1/1978 | Bahner et al. | 248/13 |
| 4,222,680 A | 9/1980 | Browning | 403/56 |
| 4,225,258 A | 9/1980 | Thompson | 403/56 |
| 4,307,864 A | 12/1981 | Benoit | 248/221.3 |
| 4,453,446 A * | 6/1984 | Hoshino | 84/421 |
| 4,461,284 A | 7/1984 | Fackler | 128/20 |

(Continued)

OTHER PUBLICATIONS

U.S. Appl. No. 08/920,847, filed Aug. 29, 1997, having priority date Jun. 28, 1994, allowed Sep. 9, 1998.

(Continued)

*Primary Examiner*—Anita King
*Assistant Examiner*—Tan Le
(74) *Attorney, Agent, or Firm*—Charles J. Rupnick

(57) ABSTRACT

A multi-positionable mounting device that provides a substantially stable, load-bearing but relatively adjustable ball and socket mounting device. An interior surface of the socket is formed of first and second opposing part hemispherical socket portions that are relatively orientable with one another for forming therebetween a part spherical cavity. The interior surface of one socket portion is formed with multiple facets at a predetermined radial distance from a spherical center point of the cavity. The first and second opposing part hemispherical socket portions are securable in a relationship which forms the part spherical cavity therebetween. A part-spherical coupler substantially fills the spherical cavity. The mechanical securing means applies clamping force that acts between the first and second opposing socket portions and secures the coupler therebetween in fixed orientation with one of the faceted socket portion.

21 Claims, 8 Drawing Sheets

U.S. PATENT DOCUMENTS

| | | | |
|---|---|---|---|
| 4,491,435 A | 1/1985 | Meier | 403/55 |
| 4,585,197 A | 4/1986 | Liautaud et al. | 248/288.5 |
| 4,620,813 A | 11/1986 | Lacher | 403/93 |
| 4,796,508 A | 1/1989 | Hoshino | 248/188.5 |
| 4,842,308 A | 6/1989 | Spotts | 285/261 |
| 4,872,630 A | 10/1989 | Cooper | 248/278 |
| 5,071,279 A | 12/1991 | Rustrom | 403/114 |
| 5,092,551 A | 3/1992 | Meier | 248/276 |
| 5,251,859 A | 10/1993 | Cyrell et al. | 248/288.3 |
| 5,270,911 A | 12/1993 | Malica et al. | 362/396 |
| 5,412,035 A | 5/1995 | Schmitt et al. | 525/93 |
| 5,419,522 A | 5/1995 | Luecke et al. | 248/288.5 |
| 5,804,747 A * | 9/1998 | Chen | 84/327 |
| 5,845,885 A | 12/1998 | Carnevali | 248/118.1 |
| 5,895,874 A * | 4/1999 | Liao | 84/421 |
| 5,937,881 A | 8/1999 | Villa | 135/20.1 |
| 5,973,248 A * | 10/1999 | Chen | 84/421 |
| 6,581,892 B1 * | 6/2003 | Carnevali | 248/276.1 |
| 2003/0098401 A1 * | 5/2003 | Carnevali | 248/276.1 |
| 2006/0000957 A1 * | 1/2006 | Carnevali | 248/181.1 |

OTHER PUBLICATIONS

Office Action mailed by PTO in co-pending reissue U.S. Appl. No. 09/733,691.

"Response to Official Action" mailed by the Applicant on Dec. 20, 2004, in co-pending reissue U.S. Appl. No. 09/733,691, pp. 1 and 27-31.

* cited by examiner

GEODESIC MOUNTING APPARATUS

The present application is a continuation of application Ser. No. 09/855,162 entitled "Positively-Positionable Mounting Apparatus" filed on May 14, 2001 now U.S. Pat. No. 6,581,892 in the name of the same named inventor and is incorporated in its entirety herein by reference.

BACKGROUND OF THE INVENTION

The present invention relates generally to flexible mounting apparatus and particularly, to molded plastic interconnecting ball and socket elements in combination with opposing universally mountable base and universal coupler interconnected thereto.

Various couplers and especially those of ball and socket variety are generally known in this art. However, except for the inventor's own ball-and-socket universally positionable mounting device disclosed in U.S. Pat. No. 5,845,885, the complete disclosure of which is incorporated herein by reference, the known couplers typically hold by friction and are prone to various degrees of slippage under load.

SUMMARY OF THE INVENTION

The present invention is a multi-positionable mounting device that provides a substantially stable, load-bearing but relatively adjustable ball and socket mounting device. The present invention provides a highly positionable mounting device formed of a base adapted for permanent mounting on a substantially flat surface and an equipment mounting element either directly interconnected or optionally interconnected by one or more rotatably interconnecting ball and socket elements.

According to one aspect of the invention, the interior surface of the socket is formed of first and second opposing part hemispherical socket portions that are relatively orientable with one another for forming therebetween a part spherical cavity which defines a spherical center point therein. The interior surface of the first socket portion is formed with multiple facets that are formed at a predetermined radial distance from a spherical center point of the part spherical cavity. A mechanical means secures the first and second opposing part hemispherical socket portions together in a relationship wherein the part spherical cavity is formed therebetween. A part-spherical coupler is provided that is sized to substantially fill the spherical cavity formed between the first and second opposing part hemispherical socket portions. The mechanical securing means applies clamping force that acts between the first and second opposing socket portions and secures the coupler therebetween in fixed orientation with one of the first and second socket portions.

According to one aspect of the invention, the facets on the interior surface of the first socket portion are each configured as substantially planar triangular facets arranged perpendicularly to the spherical center point of the part spherical cavity.

According to another aspect of the invention, the part-spherical coupler is formed as a substantially smooth, spherical shape of a pressure deformable, resilient elastomeric material, which renders it relatively radially compressible.

According to still another aspect of the invention, the part-spherical coupler is formed instead as a relatively incompressible material having a plurality of substantially planar triangular facets formed perpendicularly to and at a predetermined radial distance from a spherical center point of the coupler. The facets formed on the surface of the coupler are matched in size and shape to the facets on the interior surface of the first socket portion.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

In the FIGURES, like numerals indicate like elements.

Figure 1:
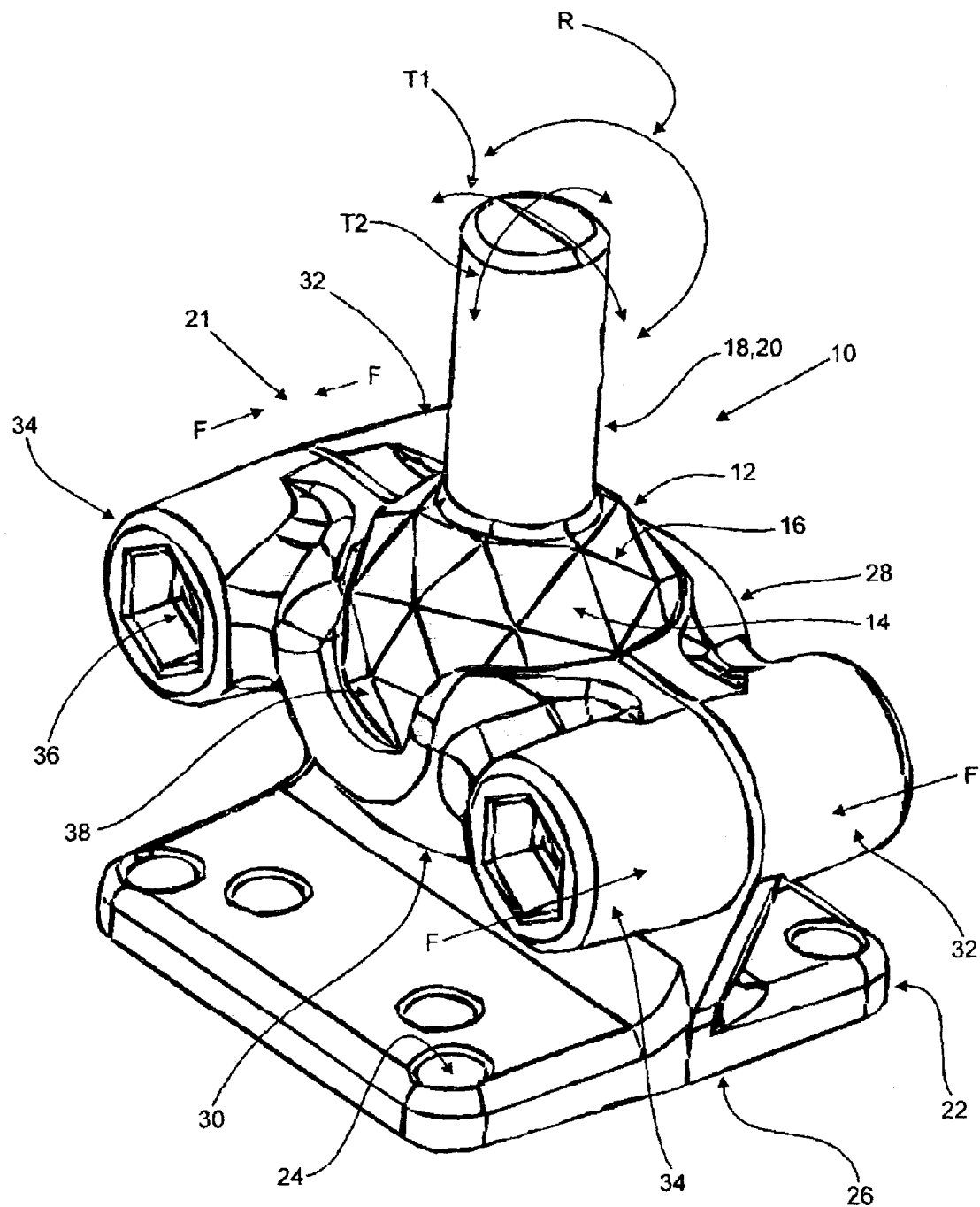
FIG. 1 is an isometric view illustrating one embodiment of the multi-positionable mounting device of the present invention.

FIG. 1 illustrates one embodiment of the geodesic sphere and mounting base of the multi-positionable mounting device of the invention. Other embodiments are disclosed and shown in subsequent FIGURES. The embodiment of a multi-positionable mounting device 10 of the invention illustrated in FIG. 1 includes part-spherical coupler 12 formed as a partial geodesic sphere, i.e., a part spherical body having a surface that is formed with a plurality of discrete substantially planar, triangularly-shaped areas 14 intersecting at angular joints 16. Each triangular area 14 is formed as a substantially planar surface oriented perpendicularly to a radius from a spherical center point of part-spherical coupler 12. Each triangular area 14 is one segment of 3-dimensional geodesic sphere 12. Geodesic sphere 12 is embodied in any number of 3-dimensional, multifaceted forms. The embodiments of the invention shown in the FIGURES and described herein are examples only and are not intended to limit the scope of the invention in any way. According to one exemplary embodiment of the invention, geodesic sphere 12 is any one of a 3-dimensional icosahedron having twenty triangular facets 14, a 3-dimensional icositetrahedron having twenty-four triangular facets 14, or another roughly spherical, 3-dimensional body having a plurality of triangular facets 14, and other equivalents thereof. Such equivalent configurations of geodesic sphere 12 are considered equivalent and within the scope of the claimed invention. Furthermore, facets 14 of part-spherical coupler 12 are alternatively 3-dimensional rather than planar, thereby forming such alternative surfaces as diamond or pyramid shaped surfaces and other equivalent multi-surface shapes. Alternatively shaped facets 14 are arranged either convexly or concavely relative to part-spherical coupler 12. That is, alternatively shaped facets 14 are formed either as projections from the surface of part-spherical coupler 12 or as indentations or depressions therein.

Geodesic sphere 12 is adapted in part with a means for connection to a user-selected external device (not shown), such as an electronic or computer device. One adaptation 18 providing the means for connection to an external device is, for example, a rod 20 projecting from one face of geodesic sphere 12. Rod 20 is optionally formed with a skull 138, which is shown in FIG. 8B and described in detail below, and geodesic sphere 12 is attached to skull 138 or molded thereabout using, for example, an injection moldable plastic material. Rod 20 is optionally formed as any of a smooth rod (shown) for slidingly engaging the external device, an internally or externally threaded rod threadedly engaging the external device, or another suitable engaging configuration. In other examples, rod 20 is formed with a flat or keyway along one longitudinal surface for accepting a cooperatively keyed external device, optionally including a set screw. Optionally, an end of rod 20 distal from the connection to geodesic sphere 12 is formed with an enlarged diameter, substantially smooth, disc-shaped member (shown in FIG. 7) that is, for example, pierced with one or more apertures for mounting screws. In another example, the disc-shaped member is fitted with a resilient adhesive pad (not shown), commonly known as a Pressure Sensitive Adhesive or PSA. Other suitable adaptations of rod 20 for removably or permanently engaging an external device are considered equivalent and are also within the scope of the claimed invention.

According to the embodiment of the invention shown in FIG. 1, multi-positionable mounting device 10 of the invention includes a socket assembly 21 adapted for temporary or permanent mounting to an external surface, such as a desktop, vehicle dashboard or control panel, a wall, bulkhead, railing, or another suitable surface for mounting the user's external device. For example, socket assembly 21 includes a base 22 that is formed with one or more clearance holes 24 for securing base 22 with screws, nails, or other suitable fasteners (not shown) to the user's mounting surface. Alternatively, the underside mounting surface 26 of base 22 is formed substantially smoothly to accommodate an adhesive or epoxy bonding material, or a resilient adhesive pad or PSA (not shown), which is equipped with an adhesive on its external surface for bonding to a substantially smooth and substantially flat surface, and is further provided with sufficient resilient thickness to effectively bond to a slightly irregular and/or curved surface. Additionally, other suitable mounting adaptations are considered equivalent and are similarly contemplated by the claimed invention.

Base 22 is configured with a socket, which is formed as a concavely-shaped depression or cavity, shown more clearly in subsequent FIGURES and described more completely below. The socket in base 22 is formed with an internal surface configured to mate with the facets 14 formed on the surface of part-spherical coupler 12. The internal socket surface of base 22 is for example, formed with a plurality of substantially planar, triangular areas that are substantially matched to triangular areas 14 on the surface of geodesic sphere 12. Alternatively, the internal socket surface of base 22 is for example, formed with alternative 3-dimensional facets, such as diamond or pyramid shaped surfaces and other equivalent shapes, matched to facets 14 of part-spherical coupler 12. The 3-dimensional facets on the interior socket surface of base 22 are formed, for example, as indentations or depressions therein to match facets 14 formed as projections from the surface of part-spherical coupler 12. Alternatively, the 3-dimensional facets on the interior socket surface of base 22 are formed, for example, as projections therefrom to match facets 14 formed as indentations or depressions in the surface of part-spherical coupler 12.

In the embodiment illustrated, base 22 is formed with a frame 28 extending above mounting base 22 and containing the matching concavely-shaped cavity or socket therein. Socket assembly 21 further includes a part hemispherical retaining cap portion 30 that is similarly formed with a concavely-shaped socket cavity having an internal surface formed with substantially planar, triangular areas that are substantially matched to triangular areas 14 on the surface of geodesic sphere 12. Retaining cap 30 is also shown more clearly in subsequent FIGURES and described more completely below. The internal surfaces of respective concavely-shaped cavities in frame 28 and retaining cap 30 together form a socket that is substantially matched in size and form to the outer surface of geodesic sphere 12 when retaining cap 30 is joined to frame 28. The planes of triangular surfaces 14 on geodesic sphere 12 are securely clamped relative to base 22 by matching surfaces of frame 28 and retaining cap 30 fitting together to form a socket having substantially the same size and the same geodesically spherical shape as geodesic sphere 12.

Retaining cap 30 and frame 28 are generally formed with means for mechanically securing one to the other. For example, each of frame 28 and retaining cap 30 include respective pairs of bosses 32 and 34, which are each formed with clearance apertures 36 (shown only in bosses 34) for accepting therethrough a screw, bolt or other suitable fastener. Such other suitable fasteners are considered equivalent forms and are similarly contemplated by the claimed invention. For example, a well-known mechanical cam arrangement (not shown) shifts frame 28 and retaining cap 30 between first and released and second tightened positions. Tightening of the fasteners, cam or other suitable tightening mechanism generates compressive clamping forces F, as indicated by arrows, in bosses 32 and 34 that are transmitted via respective frame 28 and retaining cap 30 to the socket formed therebetween. The matching flat triangular areas in frame 28 and retaining cap 30 contiguously contact and compress corresponding flat triangular areas 14 on the surface of geodesic sphere 12, while intersecting angular joints 16 between adjacent triangular areas 14 nest with corresponding angular joints between adjacent triangular areas in each of frame 28 and retaining cap 30.

Geodesic sphere 12 is thus securely locked in relative orientation with base 22 and, therethrough, with any surface to which base 22 is secured.

Geodesic sphere 12, and thus, rod 20 and any external user device attached thereto, is furthermore multiply positionable relative to base 22 and any surface to which base 22 is secured. The fasteners (not shown) through respective bosses 34 and 32 securing retaining cap 30 to frame 28 are loosened and the compressive force F therebetween released. With release of the compressive force F, geodesic sphere 12 is rotatable relative to base 22 within the socket formed between frame 28 and retaining cap 30. In such a released state, a transverse force, represented by arrows T1 and T2, a clockwise or counter-clockwise rotational force, represented by arrow R, or a combination of two or more of the transverse and rotational forces, applied to rod 20 or to a user device mounted on rod 20 causes geodesic sphere 12 to rotate relatively to frame 28 into a second different orientation thereto. After a user-determined relative orientation is achieved, the fasteners are again secured, which secures retaining cap 30 to frame 28 with compressive forces F. The orientation of geodesic sphere 12 is secured relative to base 22 when matching flat triangular areas in frame 28 and retaining cap 30 contiguously contact and compress corresponding flat triangular areas 14 on the surface of geodesic sphere 12, and intersecting angular joints 16 between adjacent flat triangular areas 14 nest with corresponding angular joints between adjacent flat triangular areas in frame 28 and retaining cap 30.

According to one or more embodiments of the present invention, retaining cap 30 is further formed with an extended motion slot 38 sized to at least permit entry of rod 20. Optionally, extended motion slot 38 is sized largely enough to allow rod 20 to move laterally within slot 38. Extended motion slot 38 thereby provides an additional degree of relative orientation between rod 20 and base 22. For example, extended motion slot 38 optionally provides as much as 90-degrees to 120-degrees or more of rotation of rod 20 relative to base 22 in a plane perpendicular to mounting surface 26 of base 22 and passing through extended motion slot 38.

Figure 2:
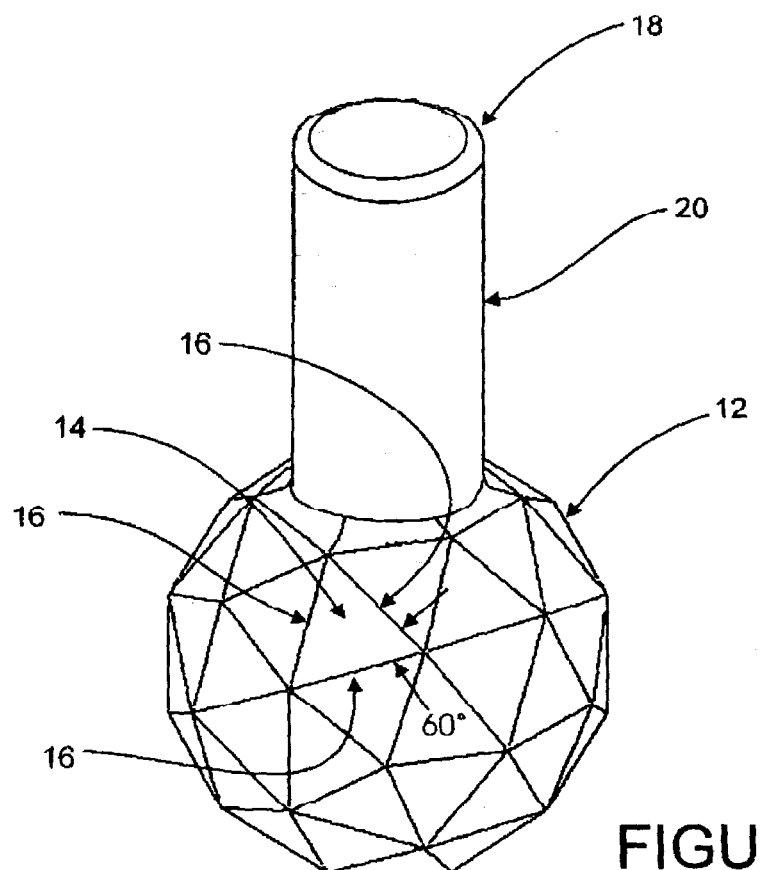
FIG. 2 is a detailed isometric view of one embodiment of the geodesic sphere of the present invention, including an external adaptation formed as a rod projecting from one face thereof.

FIG. 2 is a detailed isometric view of partial geodesic sphere 12, including external adaptation 18 formed as rod 20 projecting from one face thereof. As described above, the surface of geodesic sphere 12 is formed with a plurality of triangularly-shaped areas 14 intersecting at angular joints 16, and each triangular area 14 is one segment of 3-dimensional icosahedron geodesic sphere 12. Furthermore, each triangularly-shaped area 14 is substantially the same size and shape as every other area 14. That is, each area 14 is formed as an equilateral triangle, having substantially identical length sides each rotated at substantially 60-degrees from the adjacent sides. The planar face of each area 14 is further formed substantially perpendicularly to a radius R1 extending from the spherical center Cg (see FIG. 3) of geodesic sphere 12 and is located at a substantially identical radial distance R1 from spherical center Cg. Given the substantially identical size, shape, and position of each triangular area 14, each triangular area 14 abuts on three sides adjacent triangular areas 14 forming a substantially identical intersecting angular joint 16. Therefore, each triangular area 14 and each angular joint 16 is exactly interchangeable with every other triangular area 14 and angular joint 16, respectively, on the surface of geodesic sphere 12. Other 3-dimensional facets 14, such as diamond or pyramid shaped surfaces and other equivalent multi-surface shapes, alternatively formed on the surface of geodesic sphere 12 also abut with adjacent facets 14 forming substantially identical intersecting angular joint 16 therebetween and are similarly interchangeable.

The degree of angle of angular joints 16 is a measure of the rotation of each triangular area 14 relative to each adjacent triangular area 14. The degree of rotation between adjacent triangular areas 14 is a function of the number of triangular areas 14 forming the surface of geodesic sphere 12: a greater number of triangular areas 14 results in larger angles 16 therebetween, while a smaller number of triangular areas 14 results in smaller angles 16. The result is that geodesic sphere 12 is multiply orientable with respect to the matching triangular areas and intersecting angular joints formed on the interior concavely-shaped surface of frame 28. Each of the multiply oriented positions into which geodesic sphere 12 is orientable relative to frame 28 is a discrete position angularly rotated from multiple adjacent discrete positions. In each of the multiple discrete positions into which geodesic sphere 12 is orientable relative to socket assembly 21, triangular areas 14 mate in contiguous contact with matching triangular areas forming the interior socket surface of frame 28, and angular joints 16 nest in mating angular joints between the matching triangular areas. Each of the multiple discrete positions into which geodesic sphere 12 is orientable relative to frame 28 is angularly rotated relative to each of the other multiple discrete positions. Adjacent positions are relatively rotated to the same degree as each of triangular areas 14 forming the surface of geodesic sphere 12 is rotated relative to each of the other triangular areas 14. The degree of angular rotation between adjacent discrete positions is therefore a function of the number of triangular areas 14 forming the surface of geodesic sphere 12, and the rotational angle of joints 16. Greater numbers of triangular areas 14 result in greater numbers of adjacent discrete positions with smaller angles of rotation therebetween. Smaller numbers of triangular areas 14 result in smaller numbers of adjacent discrete positions with larger angles of rotation therebetween.

Figure 3:
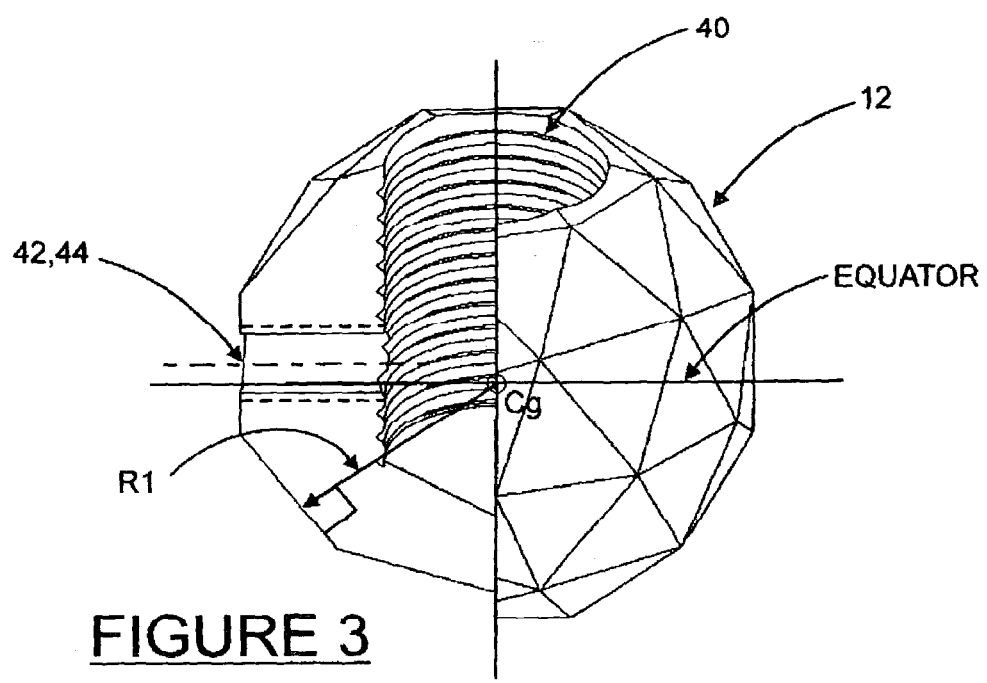
FIG. 3 illustrates one alternative embodiment of geodesic sphere of the present invention formed with an internal adaptation for accepting a mounting instrument.

FIG. 3 illustrates one alternative embodiment of partial geodesic sphere 12 wherein the means for connection to a user-selected external device is formed as an internal adaptation or bore 40. Internal adaptation 40 is optionally formed with internal threads (shown) or another adaptation 40. For example, internal adaptation 40 is alternatively a smooth-bore cylindrical hole formed in geodesic sphere 12 and having an optional hole 42 extending from one of outer triangular surfaces 14 inwardly to intersect bore hole adaptation 40 and formed with internal threads to engage a set-screw 44. In operation, set-screw 44 is threaded into threaded hole 42 and extends below the surface of triangular area 14. Set-screw 44 engages a surface of rod 20 (shown in FIG. 2) projecting from a user device into bore hole adaptation 40 to clamp the rod portion in place. Partial geodesic sphere 12 is thereby interlocked with rod 20.

Figure 4:
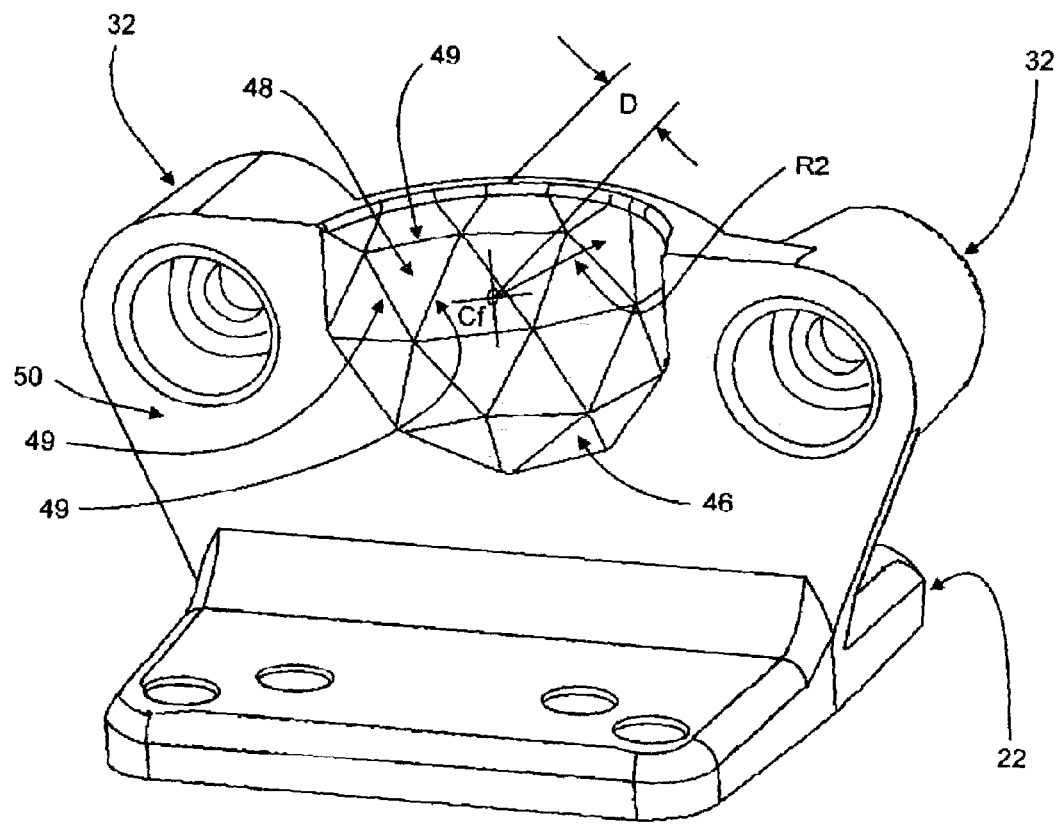
FIG. 4 is a detailed isometric view of one embodiment of a base portion of a socket assembly of the present invention.

FIG. 4 is a detailed isometric view of one embodiment of base 22. In FIG. 4, frame 28 is shown extending above the mounting base 22 and formed with a part hemispherical socket portion 46 sized to partially encompass coupler 12. Part hemispherical socket portion 46 is formed with an internal concavely-shaped surface having a plurality of triangular areas 48 that are substantially matched to triangular areas 14 on the surface of geodesic sphere 12. Triangularly-shaped areas 48 are formed at a radial distance from the spherical center Cf of concavely-shaped socket surface 46 that is substantially equal to the radial distance R1 that each triangular area 14 is from the spherical center Cg of geodesic sphere 12. Each area 48 is further formed substantially perpendicularly to radius R2 extending from the spherical center Cf of concavely-shaped socket surface 46. Furthermore, triangularly-shaped areas 48 are substantially the same size and shape as triangularly-shaped areas 14. That is, each area 48 is also formed as an equilateral triangle, having identical length sides 49 each rotated at 60-degrees from the adjacent sides, the sides being substantially the same length as the sides of triangular areas 14.

Socket cavity 46 is formed sufficiently openly to permit geodesic sphere 12 to pass thereinto along an axis perpendicular to the clamping surface 50 of frame 28. According to the embodiment illustrated, frame 28 containing therein concavely-shaped socket cavity 46 is cut by a longitudinal plane passing through the approximate spherical center Cf of concavely-shaped surface 46, thereby forming clamping surface 50. Therefore, socket cavity 46 approximately forms a quarterspherical shape (¼ sphere). Cavity 46 is thus sufficiently open to permit geodesic sphere 12 to pass thereinto along an axis perpendicular to longitudinal cutting plane 50. Furthermore, quarterspherically-shaped concave socket surface 46 extends above its spherical center Cf at least a minimum distance D, such that socket 46 is larger than a quartersphere. Therefore, when installed in socket 46, a portion of geodesic sphere 12 above its equator is captured by extension D, wherein the "equator" is defined by a plane passing through the spherical center Cg of geodesic sphere 12 (see FIG. 3). Extension D thus operates as a retaining lip portion formed as an additional quarterspherical zone extending along one axis of the quarterspherical geodesic shape beyond a spherical center of socket cavity 46. Extension D of socket cavity 46 serves to securely capture geodesic sphere 12 within frame 28 when retaining cap 30 is secured to base 22.

Figure 5A:
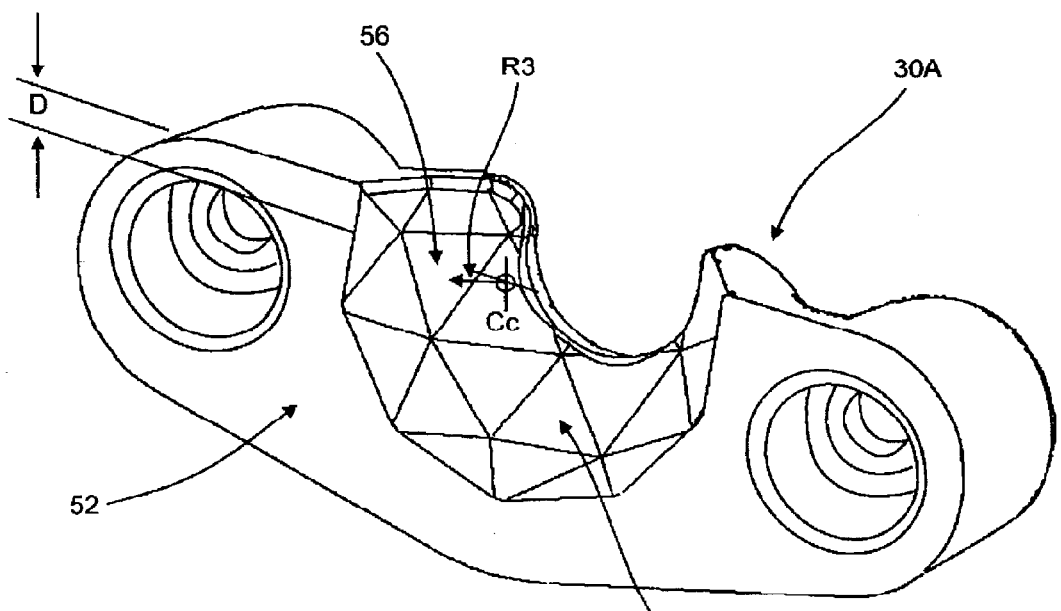
FIG. 5A illustrates one alternative embodiment of a clamp portion of a socket assembly of the present invention for use with the base portion.
Figure 5B:
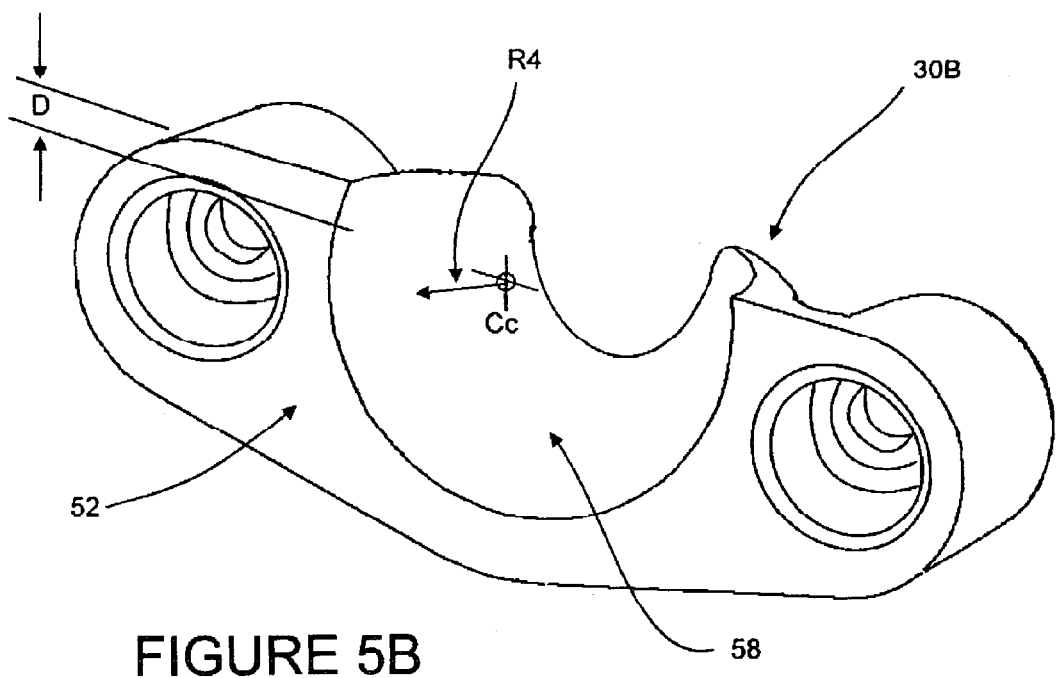
FIG. 5B illustrates another alternative embodiment of a clamp portion of a socket assembly of the present invention for use with the base portion clamp, wherein the clamp portion is formed with an internal, substantially smooth, curved surface.

FIGS. 5A and 5B are isometric views illustrating two alternative embodiments of part hemispherical retaining cap 30. FIG. 5A illustrates one alternative embodiment of the clamping surface 52 of retaining cap 30A, which preferably either actually or nearly contacts clamping surface 50 of frame 28 (shown in FIG. 4) when secured thereto with geodesic sphere 12 therebetween, as shown in FIG. 1. Retaining cap 30A is, for example, secured to frame 28 by threaded fasteners at each of apertures 36. In FIG. 5A, retaining cap 30A is formed with an internal, concavely-shaped socket surface 54 shaped substantially identically to concavely-shaped socket surface 46 formed in frame 28. That is, concavely-shaped socket surface 54 is formed having a plurality of facets 56 that are substantially the same size and shape and have substantially the same arrangement as facets 14 forming the surface of geodesic sphere 12. For example, facets 56 are formed at a radial distance R3 from the spherical center Cc of concavely-shaped socket surface 54. Radial distance R3 is substantially equal to the radial distance R1 that triangular areas 14 are from the spherical center Cg of geodesic sphere 12. Preferably, each facet 56 is a substantially planar triangularly-shaped surface substantially identical in size and shape to triangular areas 14. That is, each area 56 is also formed as an equilateral triangle, having three sides of identical length each rotated at 60-degrees from the adjacent sides, the sides being substantially the same length as the sides of triangular areas 14. Each triangular area 56 is further formed substantially perpendicularly to a radius R3 extending from the spherical center Cc of concavely-shaped surface 54.

Socket cavity 54 is formed with a part hemispherical shape, which is sufficiently open to pass over geodesic sphere 12 along an axis perpendicular to clamping surface 52 of retaining cap 30A. According to the embodiment illustrated, retaining cap 30 is cut by a longitudinal plane passing through the approximate spherical center Cc of concavely-shaped socket surface 54, thereby forming clamping surface 52. Therefore, similarly to socket cavity 46 of frame 28, socket cavity 54 approximately forms a quarterspherical shape (¼ sphere). Quarterspherically-shaped concave surface 54 also extends above its spherical center Cc at least a minimum distance D forming an additional quarterspherical zone extending along one axis of socket 54, such that a portion of geodesic sphere 12 above its equator is captured by the extension D (see FIG. 3). The extension D of part hemispherical socket cavity 54 serves to make the area covered thereby larger than a quartersphere. The increased coverage in turn increases the security with which geodesic sphere 12 is captured within frame 28 when retaining cap 30 is secured thereto.

FIG. 5B illustrates one alternative embodiment retaining cap 30B, which is formed with an internal, substantially smooth, curve-shaped surface 58 formed at a radial distance R4 from the spherical center Cc of curve-shaped surface 58. Radial distance R4 is substantially equal to the radial distance R1 that triangular areas 14 are from the spherical center Cg of geodesic sphere 12. Cavity 58 is formed sufficiently openly to pass over geodesic sphere 12 along an axis perpendicular to clamping surface 52 of retaining cap 30B. According to the embodiment illustrated, retaining cap 30B is cut by a longitudinal plane passing through the approximate spherical center Cc of concavely-shaped surface 58, thereby forming clamping surface 52. Therefore, similarly to socket cavity 46 of frame 28, socket cavity 58 approximately forms a quarterspherical shape (¼ sphere). Socket cavity 58 is thus sufficiently open to pass over geodesic sphere 12 along an axis perpendicular to longitudinal cutting plane 52. Quarterspherically-shaped concave socket surface 58 also extends above its spherical center Cc at least a minimum distance D forming an additional quarterspherical zone extending along one axis of socket 58, such that a portion of geodesic sphere 12 above its equator is captured by extended portion D (see FIG. 3). The extension D of cavity 58 serves to increase the security with which geodesic sphere 12 is captured within frame 28 when retaining cap 30B is secured thereto.

Additional Embodiments

Figure 6:
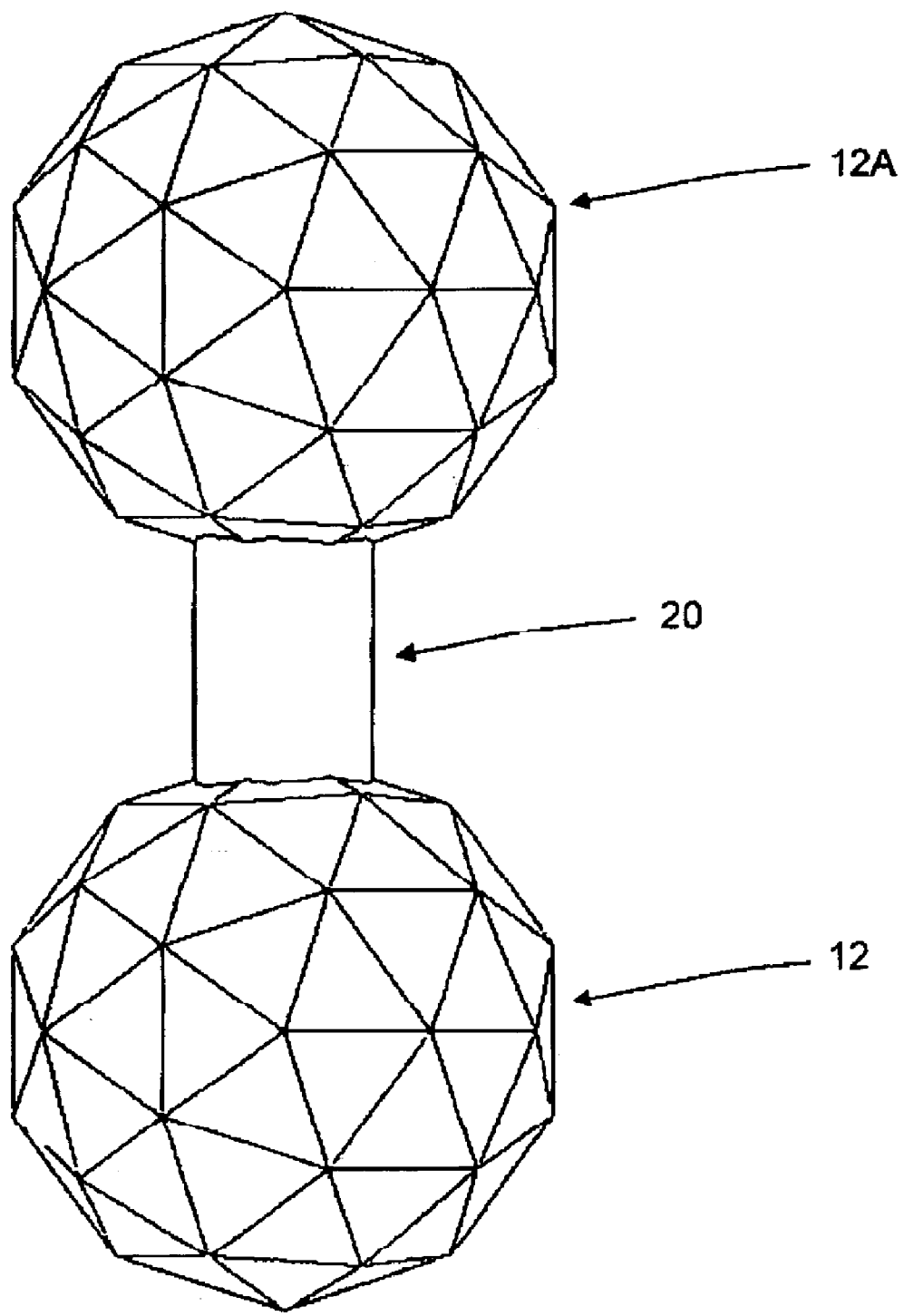
FIG. 6 illustrates another alternative embodiment of the present invention wherein a second geodesic sphere is formed on an end of a rod distal from the first geodesic sphere.

FIG. 6 illustrates another alternative embodiment of the present invention in which adaptation 18 is again formed as rod 20 extending from geodesic sphere 12. In FIG. 6, however, a second part-spherical coupler 12 formed as a second partial geodesic sphere 12A is formed on the end of rod 20 distal from first partial geodesic sphere 12. For example, second geodesic sphere 12A is formed substantially identically to first geodesic sphere 12. A second socket formed between a second assembly of a base 22 and a retaining cap 30 is mounted on a user-selected external device (not shown), such as an electronic or computer device, for example, using one of above described mounting techniques for temporarily or permanently mounting to an external surface. The second socket is clamped about second geodesic sphere 12A, as described above in connection with base 22 and retaining cap 30. Second geodesic sphere 12A thus vastly increases, in combination with second base 22 and retaining cap 30, the degrees of freedom available for orienting the external device with respect to the mounting surface of the first base 22.

Figure 7:
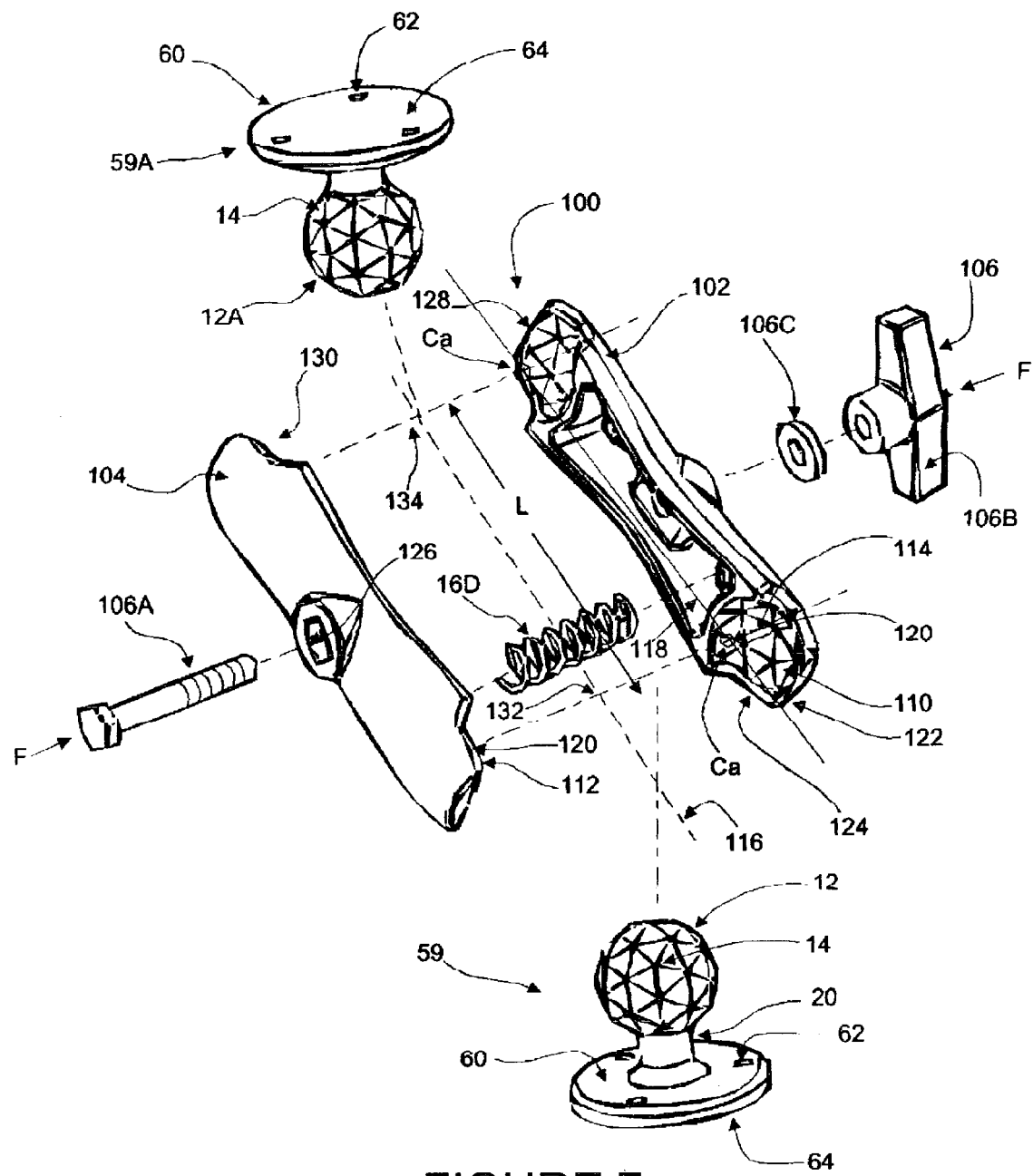
FIG. 7 illustrates another alternative embodiment of the multi-positionable mounting device of the invention, in which the geodesic sphere and mounting base reverse roles.

FIG. 7 illustrates another alternative embodiment of the multi-positionable mounting device 10 of the invention, in which the geodesic sphere and mounting base reverse roles.

In FIG. 7, partial geodesic sphere 12 is formed as a coupler 59. In FIG. 7, geodesic sphere 12 again includes rod 20 projecting from a surface thereof for coupling an attachment thereto. However, rod 20 is formed with a mounting base 60 distal from geodesic sphere 12. Mounting base 60 is preferably disc-shaped and is adapted for temporary or permanent mounting to an external surface, such as a desktop, vehicle dashboard or control panel, a wall, bulkhead, railing, or another suitable surface (not shown) for mounting the user's external device. For example, base 60 is formed with one or more clearance holes 62 for securing base 60 with screws, nails, or other suitable fasteners (not shown) to the user's mounting surface. Alternatively, an underside mounting surface 64 of base 60 opposite from geodesic sphere 12 is formed substantially smoothly to accommodate an adhesive or epoxy bonding material, or a PSA pad for bonding to a slightly irregular and/or curved surface. Additionally, other suitable mounting adaptations are considered equivalent and are also within the scope of the claimed invention.

A clamping device such as provided by above described base 22 and retaining cap 30 is optionally mounted on a user-selected external device, for example, using one of above described mounting structures for temporarily or permanently mounting to an external surface. The socket formed of base 22 and retaining cap 30 is clamped about geodesic sphere 12 of coupler 59, as described above in connection with base 22 and retaining cap 30. The embodiment thus provides the same degrees of freedom available for orienting the external device with respect to the mounting surface of the first base 22 as provided by the embodiment of FIG. 1.

Alternatively, a split arm assembly 100 is clamped about geodesic sphere 12 of coupler 59. Split arm assembly 100 includes respective elongated arm sections 102 and 104, and a clamp mechanism 106 for fastening together arm sections 102 and 104. Respective arm sections 102 and 104 each include at least one concavely-shaped socket surface 110 and 112. At least one or the other of concavely-shaped socket surface 110 and 112 is formed having a plurality of triangular areas 114 that are substantially matched to triangular areas 14 on the surface of geodesic sphere 12. Optionally, the other of respective arm sections 102 and 104 includes at least one concavely-shaped surface 110 and 112, respectively, having a an internal, substantially smooth, curve-shaped surface formed with a radius that is substantially equal to the radial distance R1 that triangular areas 14 are from the spherical center Cg of geodesic sphere 12. According to one embodiment of the invention, respective arm sections 102 and 104 each include at least one concavely-shaped surface 110 and 112, respectively, having a plurality of triangular areas 114 that are substantially matched to triangular areas 14 on the surface of geodesic sphere 12. Cavity 110 and/or 112 having triangular areas 114 is formed similarly to above described cavities 46 and 54 formed in frame 28 and retaining cap 30, respectively.

As described in above incorporated U.S. Pat. No. 5,845,885, clamp mechanism 106 includes, for example, an elongated threaded bolt 106A and an internally threaded knob 106B with internal threading sized to securely engage threaded bolt 106A, and diametrically opposing wings formed thereon for ease of turning. Preferably, a washer 106C is sleeved about the shank of bolt 106A ahead of knob 106B. As described in above incorporated U.S. Pat. No. 5,845,885, a coiled spring portion 106D separates arm sections 102 and 104, while clamp 106 holds them together against the yieldable bias of spring 106D.

In operation, arm sections 102 and 104 are arranged with respective concavely-shaped surfaces 110 and 112 operatively juxtaposed relative to one another along a line of juncture 1 16 extending therebetween. The respective rims 118 of concavely-shaped surfaces 1100 and 112 include indentations 120 and 122 formed therein along the longitudinal axis of elongated arm sections 102 and 104 and facing toward the other of concavely-shaped surfaces 110 and 112. Concavely-shaped surfaces 110 and 112 are formed with additional indentations 124 at the extreme ends of arm sections 102 and 104. Indentations 122 and 124 are provided to permit rod 20 a degree of rotational freedom with respect to line of juncture 116. Arm sections 102 and 104 are clamped together across line of juncture 116 extending therebetween by tightening of clamp mechanism 106. According to the embodiment of the invention illustrated in FIG. 7, arm sections 102 and 104 are fastened together by passing the shank of bolt 106A through an opening 126 in one of arm sections 102 and 104, through spring 106D, through an opening 126 in the other of arm sections 102 and 104, optionally placing sleeving washer 106C about the projecting threaded end portion of the shank of bolt 106A, and threadedly engaging knob 106B with bolt 106A. Clamp mechanism 106 is thereby capable of subjecting arm sections 102 and 104 to cooperating compressive forces F, as indicated by the arrows. Initially, opposing arm sections 102 and 104 are relatively loosely connected by clamp mechanism 106, i.e., clamp mechanism 106 is not tightened and spring 106D is operative to bias arm sections 102 and 104 apart from one another. During this phase of operation, split arm assembly 100 is relatively rotatable with respect to geodesic sphere 12 for changing the orientation therebetween. After a desired orientation is achieved, knob 106B is increasingly threadedly engaged with bolt 106A, which compressively engages triangular surfaces 114 of both cavities 110 and 112 with matching triangular surfaces 14 on opposing surfaces geodesic sphere 12, intersecting angular joints 16 between adjacent triangular areas 14 nesting into corresponding angular joints between adjacent triangular areas 114 The cooperating compressive forces F provided by clamp mechanism 106 act through arm sections 102 and 104 to securely lock split arm assembly 100 in relative orientation with geodesic sphere 12 and, accordingly, with any surface to which base 60 is secured.

According to yet another alternative embodiment of the invention, a second coupler 59A is provided. Second coupler 59A includes a second partial geodesic sphere 12A having a configuration similar to that of first partial geodesic sphere 12, as described immediately above. In other words, second coupler 59A includes a rod 20A (not visible) having a second geodesic sphere 12A formed at one end thereof and a mounting base 60A formed at the other end, distal from geodesic sphere 12A. Mounting base 60A is also preferably disc-shaped and includes mounting holes 62A and a substantially planar bottom surface 64A. Mounting base 60A is preferably adapted for temporarily or permanently mounting to an external surface, such as a user's external device, as described above.

Each of respective elongated arm sections 102 and/or 104 of split arm assembly 100 further includes a second concavely-shaped socket surface 128 and 130, respectively, at an end thereof opposite respective first concavely-shaped surfaces 110 and 112. At least one or the other of second concavely-shaped surfaces 128 and 130 is formed with a plurality of triangular areas 114 that are substantially matched to triangular areas 14 on the surface of geodesic sphere 12. Socket cavities 128 and 130 having triangular areas 114 are formed similarly to above described cavities 110 and 112 formed in elongated arm sections 102 and 104, respectively. Second geodesic sphere 12A is similarly rotatable relative to second concavely-shaped surfaces 128 and 130 while opposing arm sections 102 and 104 are initially relatively loosely connected by clamp mechanism 106 for selecting a desired orientation therebetween.

The respective spherical centers Cg of geodesic spheres 12 and 12A thus form loci 132 and 134 spaced apart by a distance L, which is the predetermined length of opposing arm sections 102 and 104 between the respective spherical centers Ca of first and second concavely-shaped surfaces 110 and 128 of first arm section 102 and between first and second concavely-shaped surfaces 112 and 130 of second arm section 104. During the clamping phase of operation, while clamp 106 is not yet exerting compressive forces on geodesic spheres 12 and 12A, relative rotations are accommodated. Each of geodesic spheres 12 and 12A are angularly and rotationally orientable relative to respective sockets formed by spaced apart cavities 110 and 112 and by cavities 128 and 130 at opposite ends of first and second arm sections 102 and 104. Stated differently, loosened arm sections 102 and 104 are relatively angularly and rotationally rotatable relative to one or both of geodesic spheres 12 and 12A. The length L by which loci 132 and 134 are spaced apart determines the distance by which geodesic spheres 12 and 12A are spaced apart, and consequently, the distance by which the user-selected device mounted on base 60 of geodesic sphere 12A is spaced away from the surface on which base 60A of geodesic sphere 12 is mounted.

After a desired orientation is achieved between second geodesic sphere 12A and second concavely-shaped surfaces 128 and 130, threaded engagement between knob 106B and bolt 106A is further increased, which compressively engages triangular surfaces 114 of both cavities 128 and 130 with matching triangular surfaces 14 on opposing surfaces geodesic sphere 12A. Triangular surfaces 114 of cavities 128 and 130 intersect angular joints 16 between adjacent triangular areas 14, thereby nesting into corresponding angular joints between adjacent triangular areas 114. The further cooperating compressive forces F provided by clamp mechanism 106 act through arm sections 102 and 104 to securely lock split arm assembly 100 in relative orientation with geodesic sphere 12A and, accordingly, with any user's external device to which base 60A is secured.

Figure 8A:
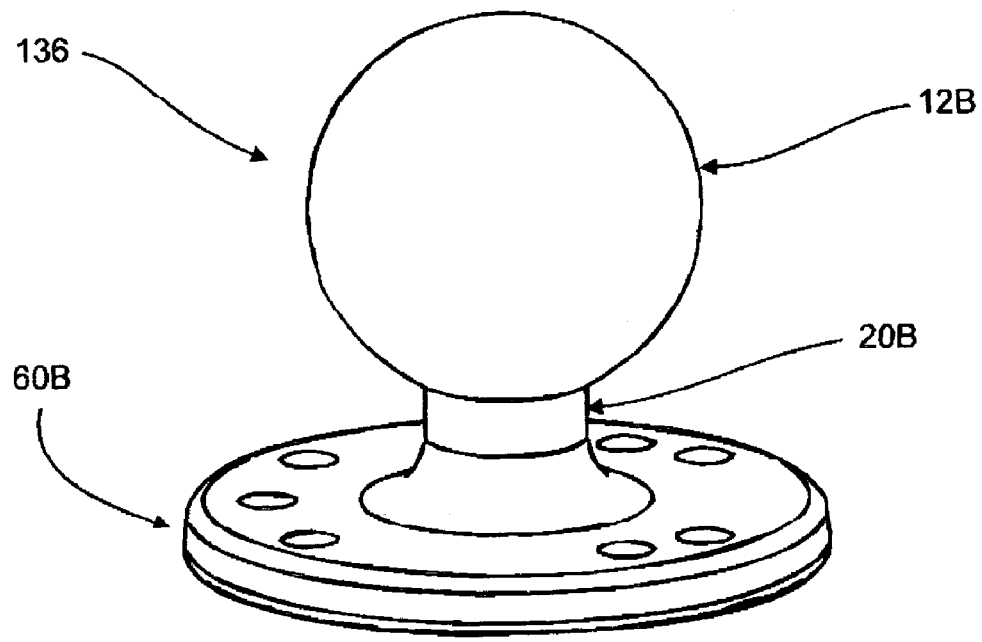
FIGS. 8A and 8B together illustrate an embodiment of the invention including a coupler having a substantially spherically-shaped head formed at an end of a rod distal from a mounting base, wherein the head is preferably formed of a pressure deformable, resilient elastomeric material, which renders it relatively radially compressible.
Figure 8B:
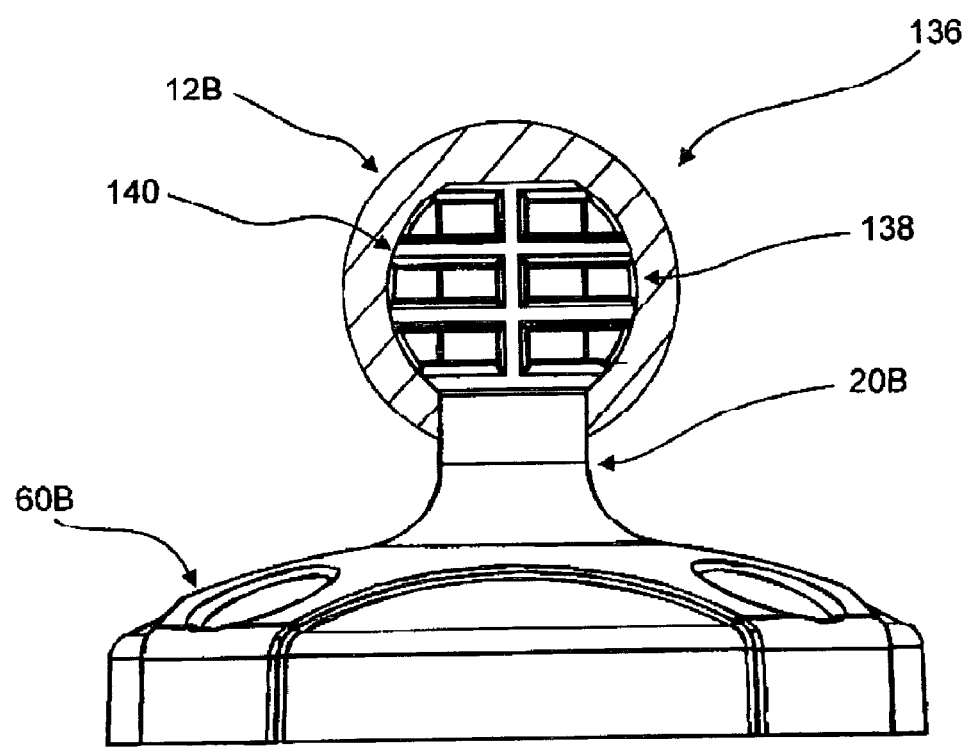

FIGS. 8A and 8B together illustrate an embodiment of the invention including a coupler 136. In FIG. 8A, coupler 136 is optionally formed of a disc shaped base 60B with a cylindrical rod 20B projecting therefrom, and a partly spherically-shaped head 12B formed at an end of rod 20B distal from base 60B. Other equivalent structures are also contemplated by the invention and are similarly considered within the scope of the claims. Spherical head 12B is preferably formed of a pressure deformable, resilient elastomeric material, which renders part spherical head 12B relatively radially compressible. Part spherical head 12B is, for example, similar to the radially compressible coupling member described in above incorporated U.S. Pat. No. 5,845,885. The resilient nature of the material forming spherical bead 12B causes it to resume its original part spherically-shaped configuration at the surfaces thereof when a compressive force is removed. Part spherical head 12B is sized with a diameter appropriate for compression either within cavities 46 of frame 28 and 54 of retaining cap 30 of the multi-positionable mounting device 10 of the invention illustrated in FIG. 1, or within cavities 110 and 112 of respective opposing arm sections 102 and 104 of the invention illustrated in FIG. 7. Preferably, the diameter of part spherical head 12B is approximately the same as the maximum diameter of geodesic sphere 12 as measured across opposing points formed at intersecting triangular areas 14 on the surface thereof. Thus, part spherical head 12B is approximately the diameter of the inner peripheral surfaces formed at the intersections of adjacent triangular areas 48 of frame 28, as measured from the spherical center Cf thereof (see FIG. 4). Preferably, base 60B and columnar rod 20B projecting therefrom are formed of a relatively rigid material, such as a metal or hard plastic. The end of rod 20B distal from base 60B is preferably formed with a skull 138 that is configured for gripping a portion of elastomeric material of partly spherically-shaped head 12B formed thereon. The configuration of skull 138 is not critical and will likely vary considerably when the invention is practiced by different manufactures.

FIG. 8B illustrates one exemplary embodiment of the invention, wherein skull 138 is optionally formed having a generally spherical shape. Optionally, a network of horizontal and vertical gripping elements 140 is formed in relief on the surface of skull 138. According to another example, skull 138 is optionally formed as a cube. Other equivalent forms of skull 138 include, for example, discs, blocks, cuboids, parallelepipeds, pyramids, cylinders, and spheres, all preferably knurled or formed with grooves, ridges, pockets, fingers, or other artifacts suitable of retaining elastomeric sphere 12B in position thereon. Such configurations and other configurations suitable for retaining skull 138 securely on rod 20B are considered to be equivalent configurations contemplated by the invention and falling within the scope of the invention.

In operation, head 12B of coupler 136 is loosely captured within a concavely-shaped socket cavity sized to fit securely thereabout when a clamping force is applied thereto. For example, head 12B is initially loosely captured within the socket formed between frame 28 and retaining cap 30. Alternatively, head 12B is loosely captured between the opposing jaws of a split arm assembly, such as split arm assembly 100, shown in FIG. 7. While so loosely engaged, head 12B is rotationally and angularly orientable relative to the concavely-shaped socket cavity. A clamping force F is applied to the socket cavity after a desired angular and rotational orientation is achieved. The pressure deformable material in the body of head 12B enables it to be squeezed between the surfaces of the concavely-shaped socket cavity. In response to the applied clamping force F, the pressure deformable elastomeric material of head 12B is relatively radially compressed between respective concavely-shaped surfaces 46 and 54 of respective frame 28 and retaining cap 30. Alternatively, head 12B relatively radially compresses between respective concavely-shaped socket surfaces 110 and 112 of respective elongated arm sections 102 and 104 via clamp mechanism 106. According to either described embodiment or another equivalent embodiment, head 12B is compressed into the shape defined by the internal facets formed by respective triangular areas 48 and 114 and flows into the angular interfaces at the intersections between the facets. Head 12B is thus deformed relative to mating concavely-shaped surfaces 46 and 54 when compressed within the socket formed between frame 28 and retaining cap 30, assuming the shape of the mating surfaces and nesting within the angular intersections. Alternatively, head 12B is compressed within the socket formed between 110 and 112 of respective arm sections 102 and 104, again assuming the shape of the mating surfaces. Thus deformed, head 12B is substantially immovably secured relative to one of respective socket assembly 21 and split arm assembly 100.

Upon release of the compressive forces F, head 12B resumes its original partially spherically-shaped configuration. In such uncompressed and part spherical condition, head 12B is again angularly and rotationally rotatable relative to mating concavely-shaped socket surfaces formed by respective socket assembly 21 and split arm assembly 100. Head 12B is angularly and/or rotationally rotated to a different second orientation relative to a socket formed by either socket assembly 21 or split arm assembly 100, or another equivalent clamp assembly. The opposing members of the clamp assembly are again secured together to form a socket having an interior surface formed, at least partially, of multiple relatively angularly rotated planar or 3-dimensional surfaces. The compressive forces F that the socket assembly exerts on head 12B again relatively radially compresses the pressure deformable elastomeric material into a mating shape. Head 12B and rod 20 projecting therefrom are thereby again locked in a fixed angular and rotational orientation with the socket assembly.

Figure 9:
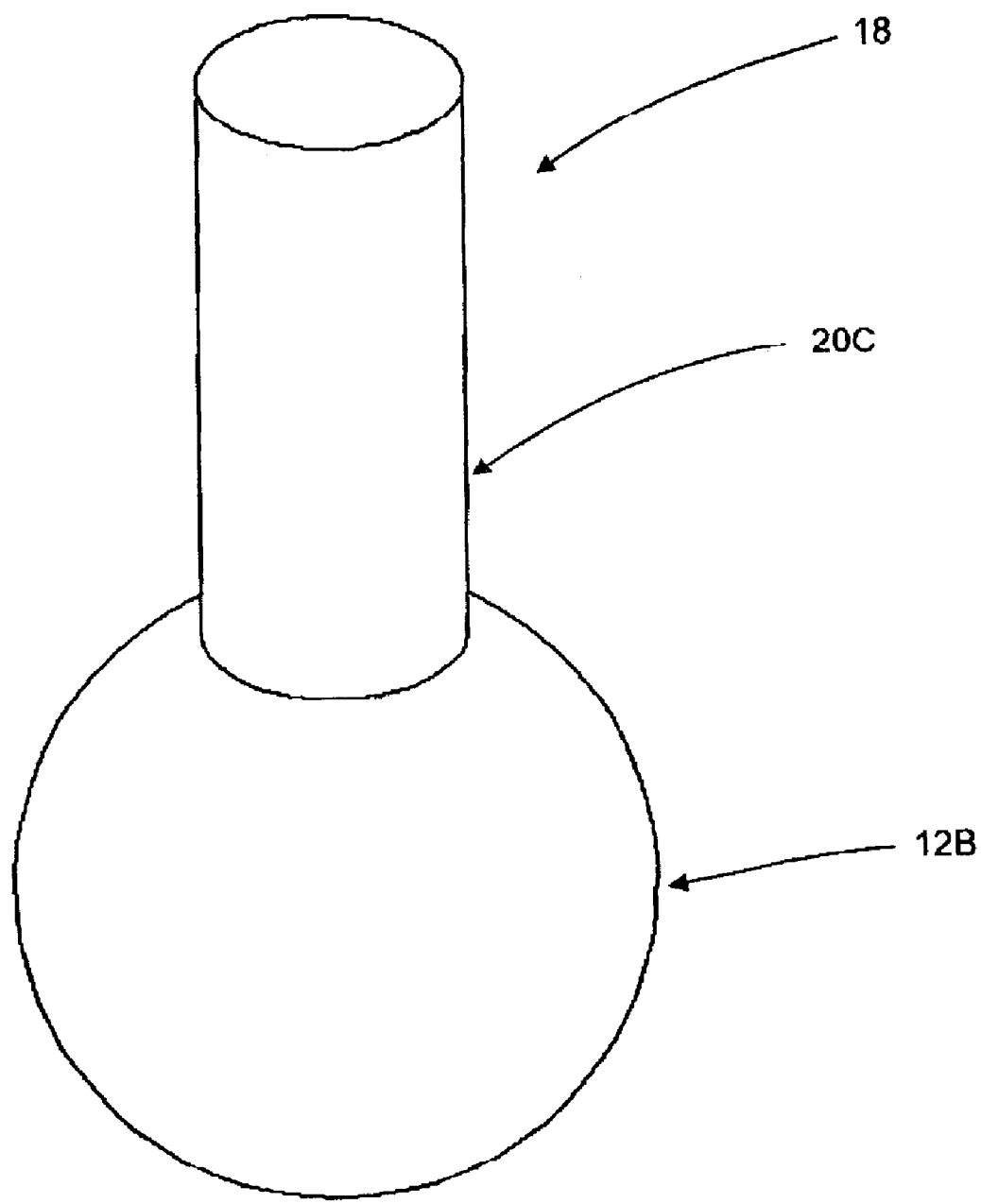
FIG. 9 illustrates another alternative embodiment of the invention, wherein geodesic sphere of FIG. 2 is formed of as substantially spherically-shaped head using a pressure deformable, resilient elastomeric material, which renders the spherical head relatively radially compressible.

FIG. 9 illustrates another alternative embodiment of the invention, wherein partial geodesic sphere 12 of FIG. 2 is formed of as partial substantially spherically-shaped head 12B formed of a pressure deformable, resilient elastomeric material, which renders spherical head 12B relatively radially compressible. FIG. 9 illustrates a detailed isometric view of geodesic sphere 12B, including external adaptation 18 formed as rod 20C projecting from one face thereof. According to the embodiment of FIG. 9, rod 20C is preferably formed of a metal or a sturdy, hard plastic material. Furthermore, rod 20C is optionally formed with a frame or "skull" portion 138 configured for gripping a portion of elastomeric material formed thereon, similar to above described skull 138 (shown in FIG. 8B). Thus, pressure deformable head 12B is angularly and rotationally orientable relative to socket assembly 21 (shown in FIG. 1) when retaining cap 30 is loosened relative to frame 28. After deformable head 12B is oriented relative to socket assembly 21, retaining cap 30 is secured to frame 28, thereby exerting clamping force F on pressure deformable head 12B. Head 12B is squeezed between the surfaces of the concavely-shaped socket cavity formed between respective concavely-shaped surfaces 46 and 54 of frame 28 and retaining cap 30. Head 12B is compressed and flows into the shape defined by the internal facets formed by respective facets 48 and angular interfaces at the intersections between the facets, assuming the shape of the mating surfaces and flowing into the angular intersections. Rod 20C is thus interlocked with socket assembly 21 in a position projecting from socket assembly 21 at a desired rotational and angular orientation. The relative orientation is solidly fixed by radial compression of the pressure deformable elastomeric material into a mating shape with respective concavely-shaped socket surfaces 46 and 54 of frame 28 and retaining cap 30.

While the preferred embodiment of the invention has been illustrated and described, it will be appreciated that various changes can be made therein without departing from the spirit and scope of the invention.

What is claimed is:

1. A multi-positionable mounting device comprising:
    a part-spherical coupler;
    a part hemispherical socket portion sized to partially encompass the coupler, the part hemispherical socket portion including a concave approximately quarterspherical socket portion and having a plurality of facets formed on an interior surface thereof and a semispherical retaining lip portion extending the quarterspherical portion beyond a spherical center thereof,
    a part hemispherical retaining cap portion sized to partially encompass the coupler and adapted for securing to the socket portion;
    means for securing the retaining cap to the socket portion; and
    wherein the part-spherical coupler further comprises a radially compressible material, and sized having a radial dimension larger than a radial dimension of the part hemispherical socket portion as measured from the spherical center thereof to a surface of one of the facets.

2. The mounting device of claim 1, wherein each of the facets further comprises a discrete triangular surface oriented perpendicularly to a radius from a spherical center point of the socket.

3. The mounting device of claim 1, wherein the part-spherical coupler is formed with a means for coupling an attachment thereto.

4. The mounting device of claim 2, wherein each of the plurality of discrete triangular surfaces further comprises a substantially planar surface.

5. The mounting device of claim 2, wherein two or more of the plurality of facets further comprise substantially identical dimensions.

6. The mounting device of claim 1, wherein the semispherical retaining lip portion further comprises an approximately quarterspherical retaining lip portion extending the quarterspherical socket portion to an approximately hemispherical socket portion, the approximately quarterspherical retaining lip portion being formed with a clearance zone therein for accommodating a connection means of the part-spherical coupler.

7. The mounting device of claim 6, wherein the clearance zone formed in the approximately quarterspherical retaining lip portion further comprises an approximately hemi-circular clearance zone.

8. A multi-positionable mounting device comprising:
    first and second opposing part hemispherical socket portions relatively orientable for forming therebetween a part spherical cavity having a spherical center point, the first part hemispherical socket portion having a plurality of triangular facets formed at a radial distance from the spherical center point and an additional part hemispherical zone extending along one axis of the part spherical cavity beyond the spherical center point thereof,
    mechanical means for securing together the first and second opposing part hemispherical socket portions in a relationship wherein the part spherical cavity is formed therebetween; and
    a part-spherical coupler formed of a radially compressible material and sized having a radial dimension larger than the radial distance of the triangular facets of the first part hemispherical socket portion from the spherical center point thereof.

9. The mounting device of claim 8, wherein the mechanical securing means applies clamping force acting between the first and second opposing socket portions securing the coupler therebetween in fixed orientation with one of the first and second socket portions.

10. The mounting device of claim 9, wherein the plurality of triangular facets are each configured as substantially planar triangular facets oriented substantially perpendicularly to the spherical center point of the part spherical cavity.

11. The mounting device of claim 8, wherein the second part hemispherical socket portion further comprises a plurality of facets formed at a radial distance from the spherical center point.

12. The mounting device of claim 11, wherein the plurality of facets formed on the second part hemispherical socket portion further comprise substantially planar triangular facets.

13. A multi-positionable mounting device comprising:
first and second opposing part hemispherical socket portions relatively orientable for forming therebetween a part spherical cavity having a spherical center point, the first part hemispherical socket portion having a lip portion formed as an additional part hemispherical zone extending along one axis of the part spherical cavity beyond the spherical center point thereof and a plurality of facets formed at a radial distance from the spherical center point;
mechanical means for securing together the first and second opposing part hemispherical socket portions in a relationship wherein the part spherical cavity is formed therebetween;
a part-spherical coupler formed in a substantially smooth, spherical shape of a pressure deformable, resilient elastomeric material, the part-spherical coupler being sized to at least substantially fill the spherical cavity formed between the first and second opposing part hemispherical socket portions and conform to the facets formed therein; and
wherein the part-spherical coupler is further sized having a radial dimension larger than a radial dimension of the first part hemispherical socket portion as measured from the spherical center thereof to a surface of one of the facets.

14. The mounting device of claim 13, wherein the part-spherical coupler further comprises a plurality of facets formed substantially perpendicularly to and at a radial distance from a spherical center point of the coupler.

15. The mounting device of claim 14, wherein the plurality of facets forming the part-spherical coupler further comprise substantially planar triangular facets.

16. The mounting device of claim 13, wherein each of the facets further comprises an equilateral triangular surface.

17. The mounting device of claim 16, wherein each of the facets further comprises a substantially planar surface.

18. A multi-positionable mounting device comprising:
a part-spherical coupler having a connection adapter projecting from one face;
a first part-hemispherical socket portion sized to partially encompass the coupler, the part hemispherical socket portion including a concave socket portion and having a plurality of facets formed on an interior surface thereof;
a second part-hemispherical socket portion sized to partially encompass the coupler and adapted for securing to the first socket portion;
structure for securing the second socket portion to the first socket portion and partially encompassing the coupler;
a part-spherical cavity formed between the first and second part-hemispherical socket portions, the cavity having an enlarged opening thereinto sized larger than the connection adapter of the part-spherical coupler; and
wherein one of the first and second socket portions further comprises an additional extended motion slot in communication with the enlarged opening and sized to permit at least partial entry thereinto of the connection adapter.

19. The mounting device of claim 18, wherein the opening into the part spherical cavity further comprises a substantially circular opening.

20. The mounting device of claim 18, wherein the opening into the part spherical cavity further comprises an opening formed in part by each of the first and second part hemispkerical socket portions.

21. The mounting device of claim 18, wherein the extended motion slot is further sized to permit ninety degree angular rotation of the connection adapter.

* * * * *